United States Patent
Seller

(10) Patent No.: US 8,625,687 B2
(45) Date of Patent: Jan. 7, 2014

(54) ULTRA-WIDEBAND RECEIVER

(75) Inventor: Olivier Seller, Auribeau sur Siagne (FR)

(73) Assignee: Cambridge Silicon Radio Limited, Cambridge (GB)

( * ) Notice: Subject to any disclaimer, the term of this patent is extended or adjusted under 35 U.S.C. 154(b) by 1212 days.

(21) Appl. No.: 12/464,799

(22) Filed: May 12, 2009

(65) Prior Publication Data

US 2009/0285263 A1    Nov. 19, 2009

(30) Foreign Application Priority Data

May 15, 2008    (GB) .................................... 0808872.6

(51) Int. Cl.
*H04L 27/28*    (2006.01)

(52) U.S. Cl.
USPC .......................................................... 375/260

(58) Field of Classification Search
USPC .......................................... 375/259, 260, 316
See application file for complete search history.

(56) References Cited

U.S. PATENT DOCUMENTS

| | | | |
|---|---|---|---|
| 7,324,437 B1 * | 1/2008 | Czylwik et al. | 370/210 |
| 7,881,391 B2 * | 2/2011 | Kalluri et al. | 375/260 |
| 2007/0198719 A1 * | 8/2007 | Su et al. | 709/226 |
| 2009/0316803 A1 * | 12/2009 | Paker et al. | 375/260 |

* cited by examiner

*Primary Examiner* — Kevin M Burd
(74) *Attorney, Agent, or Firm* — Novak Druce Connolly Bove + Quigg LLP; Vincent M DeLuca

(57) ABSTRACT

A receiver for receiving a signal that is representative of a plurality of sub-carriers modulated in dependence on transmit data, the receiver being arranged to determine a plurality of candidate vectors in dependence on the received signal, each of the candidate vectors being indicative of a modulation applied to a respective one of the sub-carriers, the receiver being further arranged to determine that the received signal incorporates a predetermined level of interference in respect of one or more of the sub-carriers and adjust one or more of the candidate vectors in dependence on that determination and determine the transmit data in dependence on the one or more adjusted candidate vectors, the receiver being arranged to adjust the one or more candidate vectors so as to reduce an influence that the candidate vectors indicative of the one or more sub-carriers would otherwise have had on the determination of the transmit data.

38 Claims, 6 Drawing Sheets

(CONVENTIONAL ART)

ULTRA-WIDEBAND RECEIVER

PRIORITY STATEMENT

This application claims the benefit, under 35 U.S.C. 119, of copending Application No. GB 0808872.6 filed 15 May 2008, entitled "UWB Receiver."

BACKGROUND

The invention relates to a receiver and in particular to a UWB receiver that receives signals that represent a plurality of sub-carriers modulated by transmit data.

Ultra-wideband (UWB) is a radio technology that transmits data at very low energy levels over a wide bandwidth. UWB may be used for short-range, high-bandwidth communications such as those in personal area networks. Conventional UWB devices are permitted to use the spectrum from 3.1 GHz to 10.6 GHz, although in practice conventional UWB transmissions are limited to between 3.1 GHz and 4.8 GHz for practical reasons. One way of transmitting data using UWB would be to spread a transmission over the entire 1.7 GHz available spectrum by means of spread spectrum techniques. However, implementing circuits that are capable of processing such a wideband signal is challenging. Instead, a multi-band approach has been developed in which the available spectrum has been divided into three sub-bands that each have a bandwidth of approximately 500 MHz, as shown in FIG. 1. FIG. 2 shows an example of how frames of data may be transmitted across the three different sub-bands. In this example, the first frame is transmitted over the first sub-band, the second frame is transmitted over the third sub-band, the third frame over the second-sub-band, the fourth frame over the first sub-band and so on. Each frame of data 201 is separated from the preceding frame by a guard interval 204. Each frame may include a cyclic prefix 202 inserted before the transmit data 203. The transmit data may include one or more symbols.

UWB systems may transmit data using orthogonal frequency division multiplexing techniques (OFDM) to transmit information on each of the sub-bands. OFDM offers high spectral efficiency, is resilient to RF interference and is able to efficiently capture multi-path energy. An OFDM signal is typically a composite of a number of orthogonal sub-carriers modulated with baseband data. Each sub-carrier may be independently modulated using some type of phase-shift keying or quadrature amplitude modulation, or a combination of the two. The composite baseband signal is then used to modulate a main RF carrier for transmission.

Part of an OFDM transmitter is shown in FIG. 3. This section of the transmitter receives a single input data stream 301 that is converted into N parallel data streams 303 by means of a switching unit 302. A mapping unit may also be provided for mapping the parallel bit streams into parallel symbol streams, but this is not shown in FIG. 3. Each of the parallel data streams represents a signal in the frequency domain. An inverse Fourier transform is performed by processing block 304 to transform the parallel data streams into real and imaginary time domain signals that can be used to modulate an RF carrier signal 307.

Part of an OFDM receiver is shown in FIG. 4. This section of the receiver receives a signal and mixes it down to baseband 401 to generate real 402 and imaginary 403 data streams. These data streams represent a time domain signal and are input into a processing block 404 that performs a Fourier transform to recover N parallel data streams 405 in the frequency domain. A switching unit 406 receives the N parallel data streams and forms a single data stream 407 therefrom. Symbol demapping may also be performed at this point.

UWB transmitters typically use 128 sub-carriers or tones on each sub-band. Each symbol to be transmitted may be mapped onto a point on a modulation constellation for a particular sub-carrier. This point indicates the combination of phase and/or modulation to be applied to that sub-carrier. If N sub-carriers are used, and each sub-carrier is modulated by M alternative symbols, the OFDM symbol alphabet consists of $M^N$ combined symbols. The time domain signal can then be calculated as:

$$v(t) = \sum_{k=0}^{N-1} X_k e^{j2\pi kt/T}, 0 \le t < T \quad (1)$$

where v(t) is the time domain signal, $\{X_k\}$ are the data symbols, N is the number of sub-carriers and T is the OFDM symbol time.

The original frequency domain signal can be recovered by calculating the Fourier transform of the time domain signal:

$$X_k = \sum_{t=0}^{T} v(t) e^{j2\pi kt/T}, 0 \le k \le N-1 \quad (2)$$

UWB receivers may encounter difficulties when one or more of the sub-carriers in the sub-band being used is subject to interference. This situation is shown in FIG. 5, which shows a UWB signal that is obscured by interference over some of its frequency spectrum. This interference can cause the output of the FFT to saturate for the affected sub-carriers. If the interference is extensive, it might even cause either or both of the in-phase and quadrature components generated by mixing the received signal down to baseband to saturate. Existing receivers deal with saturated sub-carriers by simply setting the FFT output for that sub-carrier to the maximum magnitude possible. However, if the reason for the saturation is that the saturated sub-carriers were subject to interference, then the interference will influence the decoding of the signal and may cause bit errors. Therefore, there is a need for an improved UWB receiver that is capable of limiting the impact that interference has on the decoding of a received signal.

SUMMARY

According to a first embodiment of the invention, there is provided a receiver for receiving a signal that is representative of a plurality of sub-carriers modulated in dependence on transmit data, the receiver being arranged to determine a plurality of candidate vectors in dependence on the received signal, each of the candidate vectors being indicative of a modulation applied to a respective one of the sub-carriers, the receiver being further arranged to determine that the received signal incorporates a predetermined level of interference in respect of one or more of the sub-carriers and adjust one or more of the candidate vectors in dependence on that determination and determine the transmit data in dependence on the one or more adjusted candidate vectors, the receiver being arranged to adjust the one or more candidate vectors so as to reduce an influence that the candidate vectors indicative of the one or more sub-carriers would otherwise have had on the determination of the transmit data.

The receiver may be arranged to determine that a received signal incorporates the predetermined level of interference in respect of a sub-carrier if the candidate vector indicative of a modulation applied to that sub-carrier has a magnitude that exceeds a predetermined threshold.

The receiver may be arranged to form in-phase and quadrature signals from the received signal, the receiver being arranged to determine that the received signal incorporates the predetermined level of interference in respect of all of the sub-carriers if either of the in-phase or quadrature signals has an amplitude that exceeds a predetermined threshold.

The receiver may be arranged to form in-phase and quadrature signals from the received signal, the receiver being arranged to determine the plurality of candidate vectors by means of a Fourier transform performed on those in-phase and quadrature signals.

The receiver may be arranged to determine the transmit data in dependence on the magnitude of the adjusted and non-adjusted candidate vectors such that each candidate vector exerts an influence on the determination that is dependent on the magnitude of that vector.

The receiver may be arranged to adjust the one or more candidate vectors by changing the magnitude of those one or more candidate vectors.

The receiver may be arranged to adjust the one or more candidate vectors by decreasing the magnitude of the candidate vectors that are indicative of a modulation applied to sub-carriers in respect of which the received signal is determined to incorporate the predetermined level of interference.

The receiver may be arranged to decrease the magnitude of the candidate vectors indicative of a modulation applied to sub-carriers in respect of which the received signal is determined to incorporate the predetermined level of interference in accordance with a predetermined, non-linear function that relates the magnitude of a candidate vector with the magnitude of the adjusted candidate vector to be formed from that candidate vector, such that the larger the magnitude of the candidate vector, the greater the proportion by which the magnitude of that vector is reduced to form the adjusted candidate vector.

The receiver may be arranged to decrease the magnitude of the candidate vectors indicative of a modulation applied to sub-carriers in respect of which the received signal is determined to incorporate the predetermined level of interference by multiplying each of those candidate vectors by a multiplier.

The receiver may be arranged to select the multiplier in dependence on an amplitude of the received signal and/or on a channel estimation associated with a transmit channel over which the received signal was received.

The receiver may be arranged to adjust the one or more candidate vectors by decreasing to zero the candidate vectors that are indicative of a modulation applied to sub-carriers in respect of which the received signal is determined to incorporate the predetermined level of interference.

The receiver may be arranged to adjust the one or more candidate vectors by increasing the magnitude of candidate vectors that are indicative of a modulation applied to sub-carriers in respect of which the received signal does not incorporate the predetermined level of interference.

The receiver may be arranged to increase the magnitude of those candidate vectors by multiplying each of those candidate vectors by a multiplier.

The receiver may be arranged to multiply every candidate vector that is indicative of a modulation applied to sub-carriers in respect of which the received signal does not incorporate the predetermined level of interference by the same multiplier.

The receiver may be arranged to multiply one of the candidate vectors that is indicative of a modulation applied to sub-carriers in respect of which the received signal does not incorporate the predetermined level of interference by a different multiplier from another of those candidate vectors.

The receiver may be arranged to increase the magnitude of the candidate vectors indicative of a modulation applied to sub-carriers in respect of which the received signal is determined not to incorporate the predetermined level of interference in accordance with a predetermined, non-linear function that relates the magnitude of a candidate vector with the magnitude of the adjusted candidate vector to be formed from that candidate vector, such that the smaller the magnitude of the candidate vector, the greater the proportion by which the magnitude of that vector is increased to form the adjusted candidate vector.

The receiver may be arranged to generate data strings that correspond to each sub-carrier, each data string comprising a plurality of bits, and to select a subset of that plurality of bits to form each candidate vector.

The receiver may be arranged to generate the data strings by performing a Fourier transform on the in-phase and quadrature signals.

The receiver may be arranged to adjust the one or more candidate vectors by shifting the bits of the data strings that form those one or more candidate vectors in a first direction until each of the one or more candidate vectors contains a bit of predetermined value at a predetermined position within that vector.

The receiver may be arranged to shift the bits contained within each data string until the leftmost, non-zero bit of every candidate vector is located at the same position in each candidate vector.

The receiver may be arranged to determine that a candidate vector is indicative of a modulation applied to a sub-carrier that is adjacent in a frequency spectrum to a sub-carrier in respect of which the received signal incorporates the predetermined level of interference and to, responsive to that determination, adjust that candidate vector so as to reduce an influence that the candidate vector would otherwise have had on the determination of the transmit data.

According to a second aspect of the invention, there is provided a receiver for receiving a signal that is representative of a plurality of sub-carriers modulated in dependence on transmit data, the receiver being arranged to determine a plurality of candidate vectors in dependence on the received signal, each of the candidate vectors being indicative of a modulation applied to a respective one of the sub-carriers, the receiver comprising a signal processor that is arranged to determine that the received signal incorporates a predetermined level of interference in respect of one or more of the sub-carriers and adjust one or more of the candidate vectors in dependence on that determination and determine the transmit data in dependence on the one or more adjusted candidate vectors, the receiver being arranged to adjust the one or more candidate vectors so as to reduce an influence that the candidate vectors indicative of the one or more sub-carriers would otherwise have had on the determination of the transmit data.

According to a third aspect of the invention, there is provided a method for decoding a signal that is representative of a plurality of sub-carriers modulated in dependence on transmit data, the method comprising determining a plurality of candidate vectors in dependence on the received signal, each of the candidate vectors being indicative of a modulation applied to a respective one of the sub-carriers, determining that the received signal incorporates a predetermined level of interference in respect of one or more of the sub-carriers and adjusting one or more of the candidate vectors in dependence on that determination and determining the transmit data in dependence on the one or more adjusted candidate vectors, wherein the one or more candidate vectors are adjusted so as to reduce an influence that the candidate vectors indicative of the one or more sub-carriers would otherwise have had on the determination of the transmit data.

The method may comprise determining that a received signal incorporates the predetermined level of interference in respect of a sub-carrier if the candidate vector indicative of a modulation applied to that sub-carrier has a magnitude that exceeds a predetermined threshold.

The method may comprise forming in-phase and quadrature signals from the received signal and determining that the received signal incorporates the predetermined level of interference in respect of all of the sub-carriers if either of the in-phase or quadrature signals has an amplitude that exceeds a predetermined threshold.

The method may comprise forming in-phase and quadrature signals from the received signal and determining the plurality of candidate vectors by means of a Fourier transform performed on those in-phase and quadrature signals.

The method may comprise determining the transmit data in dependence on the magnitude of the adjusted and non-adjusted candidate vectors such that each candidate vector exerts an influence on the determination that is dependent on the magnitude of that vector.

The method may comprise adjusting the one or more candidate vectors by changing the magnitude of those one or more candidate vectors.

The method may comprise adjusting the one or more candidate vectors by decreasing the magnitude of the candidate vectors that are indicative of a modulation applied to sub-carriers in respect of which the received signal is determined to incorporate the predetermined level of interference.

The method may comprise decreasing the magnitude of the candidate vectors indicative of a modulation applied to sub-carriers in respect of which the received signal is determined to incorporate the predetermined level of interference in accordance with a predetermined, non-linear function that relates the magnitude of a candidate vector with the magnitude of the adjusted candidate vector to be formed from that candidate vector, such that the larger the magnitude of the candidate vector, the greater the proportion by which the magnitude of that vector is reduced to form the adjusted candidate vector.

The method may comprise decreasing the magnitude of the candidate vectors that are indicative of a modulation applied to sub-carriers in respect of which the received signal is determined to incorporate the predetermined level of interference by multiplying each of those candidate vectors by a multiplier.

The method may comprise selecting the multiplier in dependence on an amplitude of the received signal and/or on a channel estimation associated with a transmit channel over which the received signal was received.

The method may comprise adjusting the one or more candidate vectors by decreasing to zero the candidate vectors that are indicative of a modulation applied to sub-carriers in respect of which the received signal is determined to incorporate the predetermined level of interference.

The method may comprise adjusting the one or more candidate vectors by increasing the magnitude of candidate vectors that are indicative of a modulation applied to sub-carriers in respect of which the received signal does not incorporate the predetermined level of interference.

The method may comprise increasing the magnitude of those candidate vectors by multiplying each of those candidate vectors by a multiplier.

The method may comprise multiplying every candidate vector that is indicative of a modulation applied to sub-carriers in respect of which the received signal does not incorporate the predetermined level of interference by the same multiplier.

The method may comprise multiplying one of the candidate vectors that is indicative of a modulation applied to sub-carriers in respect of which the received signal does not incorporate the predetermined level of interference by a different multiplier from another of those candidate vectors.

The method may comprise increasing the magnitude of the candidate vectors indicative of a modulation applied to sub-carriers in respect of which the received signal is determined not to incorporate the predetermined level of interference in accordance with a predetermined, non-linear function that relates the magnitude of a candidate vector with the magnitude of the adjusted candidate vector to be formed from that candidate vector, such that the smaller the magnitude of the candidate vector, the greater the proportion by which the magnitude of that vector is increased to form the adjusted candidate vector.

The method may comprise generating data strings that correspond to each sub-carrier, each data string comprising a plurality of bits, and to select a subset of that plurality of bits to form each candidate vector.

The method may comprise generating the data strings by performing a Fourier transform on the in-phase and quadrature signals.

The method may comprise adjusting the one or more candidate vectors by shifting the bits of the data strings that form those one or more candidate vectors in a first direction until each of the one or more candidate vectors contains a bit of predetermined value at a predetermined position within that vector.

The method may comprise shifting the bits contained within each data string until the leftmost, non-zero bit of every candidate vector is located at the same position in each candidate vector.

The method may comprise determining that a candidate vector is indicative of a modulation applied to a sub-carrier that is adjacent in a frequency spectrum to a sub-carrier in respect of which the received signal incorporates the predetermined level of interference and, responsive to that determination, adjusting that candidate vector so as to reduce an influence that the candidate vector would otherwise have had on the determination of the transmit data.

DESCRIPTION OF THE DRAWINGS

The present invention will now be described by way of example only, with reference to the accompanying drawings. In the drawings.

DETAILED DESCRIPTION

A receiver may be arranged to receive a signal that is representative of a plurality of sub-carriers modulated in dependence on transmit data. The receiver may determine a plurality of candidate vectors in dependence on the received signal, such that each candidate vector is indicative of a modulation applied to a respective one of the sub-carriers. If the receiver determines that the received signal incorporates a level of interference in respect of one or more of the sub-carriers that exceeds a predetermined threshold, it may adjust one or more of the candidate vectors accordingly. The adjusted candidate vectors may be associated with sub-carriers that were subject to inference and/or were not subject to interference. The receiver is suitably arranged to perform the adjustment in such a way that an influence that the candidate vectors associated with interfered sub-carriers would otherwise have had on the determination of the transmit data is reduced.

Adjusting the candidate vectors in this way is a simple way of addressing the problem of interference on one or more of the sub-carriers that does not require complex processing of the received signal. It may be particularly effective in receivers that have well-adjusted gain control, so that the presence of interference on one or more of the sub-carriers can be determined with a high degree of success.

The adjustment applied to one or more of the candidate vectors is suitably in accordance with some predetermined function and may include, for example, addition, subtraction, multiplication or division. An aim of the adjustment may be to reduce an influence of interference on the determination of the transmit data. One way of achieving this is to reduce the magnitude of candidate vectors associated with sub-carriers that have been subject to interference and/or to increase the magnitude of candidate vectors associated with sub-carriers that have not been subject to interference. This is because the determination of the transmit data is typically dependent on the magnitude of the candidate vectors, so that adjusting their magnitude in dependence on the interference suffered by one or more of the sub-carriers may reduce an influence of that interference on the decoding process. Therefore, the number of bit errors caused by the interference may be reduced.

Figure 6:
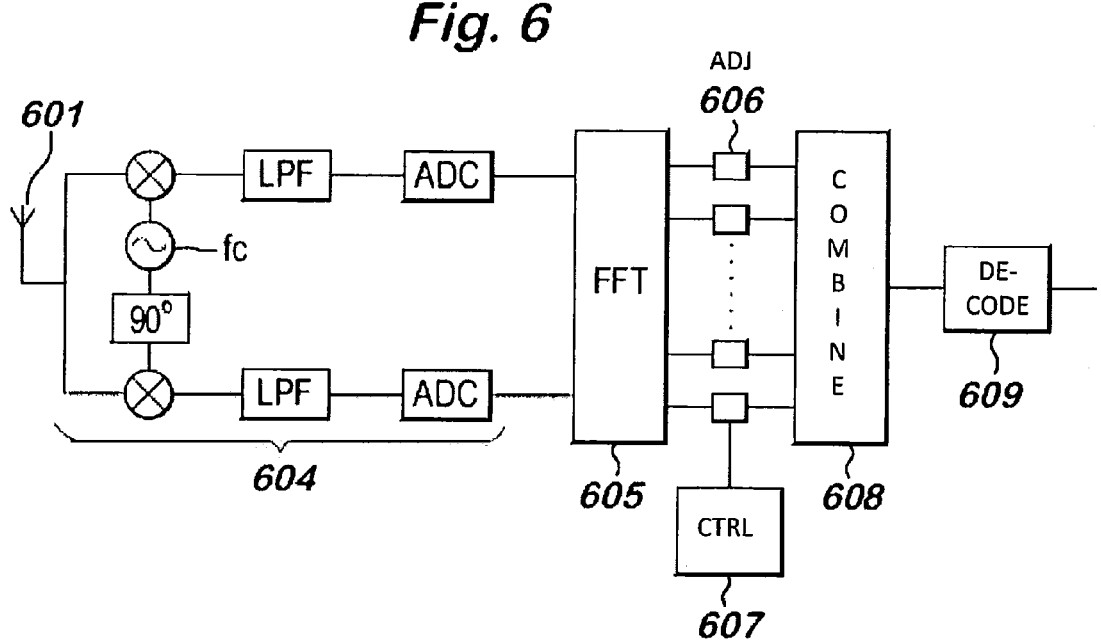
FIG. 6 shows an example of a UWB receiver.

An example of a receiver according to an embodiment of the invention is shown in FIG. 6. The receiver is arranged to receive a signal via receiver 601. The receiver may be arranged to pass the received signal to a synchroniser for the first few symbols of the signal. If the first few symbols of the signal are known to the receiver, then the receiver may be able to estimate the starting point of the frame by correlating the received signal with the known symbol sequence. When the starting point of the frame has been identified, the receiver typically disables the synchroniser. The synchroniser is therefore not shown in FIG. 6.

The signal received by the antenna is passed to the mixing circuit 604 to generate in-phase and quadrature baseband signals. These signals are passed to the transform unit 605 that computes a fast Fourier transform on the baseband signals. The Fourier transform outputs a data strings corresponding to each sub-carriers or tone that are output to the adjustment units 606. The candidate vectors may be formed of the whole or a subset of these data strings.

The transform unit may perform an overlap-and-add operation when computing the Fourier transform. For example, for a given symbol, the receiver may receive 165 bits, with bits 1 to 128 representing the symbol and bits 129 to 165 being zero (if the signal has not been subject to multipath effects). The FFT may then be performed over bits 1:128. However, this may not capture all the channel energy if multipath effects have occurred. To address this problem, an overlap and add operation may be performed by overlapping segments of the received signal. For example, an overlap-and-add of length 20 would give a segment of essentially three parts: bits 1:20; bits 21:128; bits 129:148. Bits 1:20 and bits 129:148 may be overlapped with other segments of the received signal. This may be advantageous because incorporating bits 1:148 into the FFT may allow all the channel energy to be captured. This is because any echoes will typically be present in bits 129:148.

The candidate vectors formed from the output of the FFT represent a modulation applied to each of the sub-carriers. This modulation may incorporate any modulation intentionally applied to the sub-carrier signals at the transmitter (e.g. any phase, amplitude or frequency modulation) together with any modulation caused by distortion, interference etc encountered by the signal during transmission.

The adjustment units are controlled by control unit 607 to make any adjustments to the candidate vectors that are required. These will be described in more detail below.

Some of the transmitted data symbols may be repeated in the frequency domain (e.g. by being transmitted over two or more sub-carriers) and/or in the time domain (e.g. by the same data being transmitted as symbols N and N+1). Therefore, in order to determine the transmitted data, the candidate vectors may be supplied to a combining unit 608 that combines, as required, candidate vectors corresponding to different sub-carriers and/or different symbols. The combining unit may use Maximum Ratio Combining techniques to perform this function. The data stream output by the combining unit is then received by a decoding unit 609. The functions performed by the decoding unit may include e.g. demapping, degrouping, deinterleaving and decoding. The demapping process may involve a Log Likelihood Ratio calculation, which results in a 'soft bit' representation of the transmit data. The decoder is suitably one that accepts such soft bits at its input, e.g. the decoder may be a Viterbi decoder.

As an example, a complex value $X_k$ has been sent on each sub-carrier k. After synchronisation, overlap-and-add, FFT etc, a candidate vector $Y_k$ is generated in respect of each sub-carrier. The candidate vector can be represented by:

$$Y_k = X_k * H_k + N_k \quad (3)$$

where $H_k$ is the complex channel coefficient for carrier k and $N_k$ is the complex noise experienced by that carrier.

The candidate vectors may be passed to an equalisation step that forms the basis for demodulation. This equalisation step involves calculating $Y_k * \mathrm{conj}(H_k)$. If $X_k$ was formed using QPSK modulation, then by applying the definition of the Log Likelihood Ratio and a noise distribution function, soft values for the two transmitted bits can be calculated as:

$$LLR_{k_0} = \mathrm{real}(Y_k * \mathrm{conj}(H_k)) \quad (4)$$

$$LLR_{k_1} = \mathrm{imag}(Y_k * \mathrm{conj}(H_k)) \quad (5)$$

Because the same information is received via more than one sub-carrier, the accuracy of the decoding can be improved by combining the candidate vectors corresponding to the different sub-carriers. For example, in a system that uses two sub-carriers, two candidate vectors $Y_{k_1}$ and $Y_{k_2}$ may represent the same transmitted symbol. The transmitted symbol can be determined by performing Maximum Ratio Combining on the two candidate vectors, e.g. by calculating:

$$Y_{k_1}^* \text{conj}(H_{k_1}) + Y_{k_2}^* \text{conj}(H_{k_2}) \qquad (6)$$

To compute LLRk0 and LLRk1 the real and imaginary parts of equation 6 are taken, in a similar way to that shown in equations 4 and 5.

The above demapping scheme is optimal if the channel coefficients are known, and even in real systems in which the channel coefficients are not known exactly, the above scheme may still be the best option when the channel coefficients are known to a reasonable degree of accuracy.

In the above scheme, the higher the received power of a particular sub-carrier, the more weight is given to that sub-carrier during the demapping. In particular, the Log Likelihood Ratios are proportional to the square of the estimated channel amplitude. If a sub-carrier is subject to interference, the amplitude of its channel is overestimated and so the Log Likelihood Ratio will incorporate an error (typically this will be an overestimation). The Log Likelihood Ratios may be fed into a viterbi decoder that adds the Log Likelihood Ratios together to find a path of maximum weight on a trellis. Therefore, if a Log Likelihood Ratio is overestimated, the weight given to that Log Likelihood Ratio during the search for the best path through the trellis will also be overestimated.

In one example, the ADC in each of the in-phase and quadrature receive chains may be a 6 bit ASC. I/Q compensation may be performed on each of the in-phase and quadrature signals, which adds two precision bits. The FFT is then performed on the resulting 8 bits. The FFT adds more bits, because of the 128 sub-carriers or tones that need to be considered in a typical UWB system. This introduces a further 7 bits, giving a total of 15 bits. Out of these 15 bits, typically 8 are selected for further processing. In this example, those 8 bits form the candidate vector.

Figure 7:
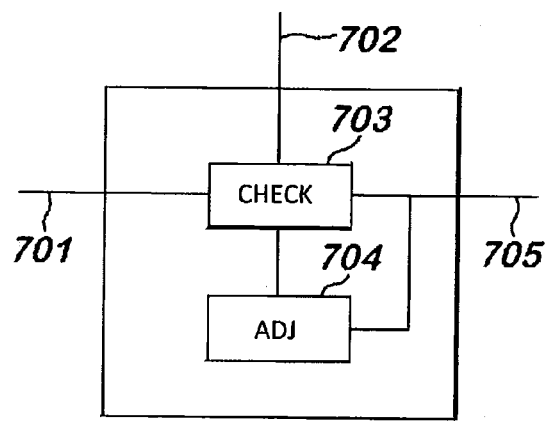
FIG. 7 shows an adjustment unit.

An example of an adjustment unit for forming the adjusted candidate vectors is shown in FIG. 7. The adjustment unit is arranged to receive a data string 701 associated with a particular sub-carrier from the transform unit and a control signal 702 from the control unit. The adjustment unit comprises a check unit 703 and an adjustor 704. The check unit may be arranged to receive the data string and check that the sub-carrier has not been subject to interference. The check unit may be arranged to determine that the sub-carrier has been subject to interference if the magnitude of the candidate vector that will be selected from that data string exceeds a predetermined threshold. The predetermined threshold may be determined to have been exceeded if the candidate vector is saturated. The check unit may be arranged to inform the control unit via control line 702 that the sub-carrier has been subject to interference. Similarly, the check unit may also be arranged to inform the control unit that the sub-carrier has not been subject to interference.

If the check unit determines that a sub-carrier has been subject to interference it may automatically pass the data string to the adjustor so that the candidate vector can be adjusted according to a predetermined function. Alternatively, the check unit may wait for instructions from the control unit. The check unit may be instructed by the control unit to adjust the candidate vector irrespective of whether the candidate vector was indicative of its associated sub-carrier being subject to interference or not.

If the check unit determines that the candidate vector is to be adjusted, or if it is instructed by the control unit to do so, it may pass the data string to the adjustor for the adjustment to be performed. Alternatively, the data string may be read directly into the adjustor from the transform unit, with the check unit checking whether or not the sub-carrier was subject to interference. The adjustor performs the required adjustment (if any) of the candidate vector and supplies it to the output of the adjustment unit 705.

In one embodiment, the adjustor may be a bit-shifter. This enables the candidate vectors to be multiplied or divided. Also, if each candidate vector comprises a subset of the data string, the bits that from the candidate vector can be selected by shifting bits in or out of a selection 'window'.

The receiver may comprise a signal processor that is arranged to receive and process the in-phase and quadrature baseband signals. For example, the signal processor may implement one or more of: the transform unit, the adjustment units, the control unit, the combining unit and the decoding unit.

Some examples of functions that may be applied to the candidate vectors to reduce the influence that interference has on the determination of the transmit data will now be described. However, this is for the purposes of example only, and it should be understood that any suitable function or algorithm might be employed.

Figure 1:
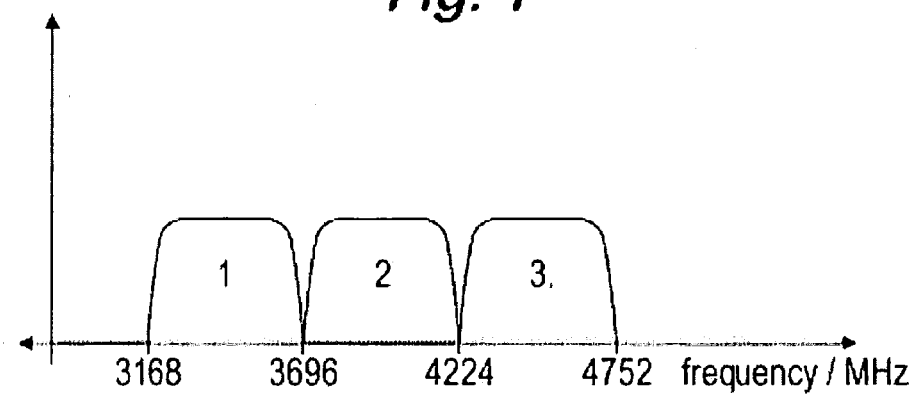
FIG. 1 shows the three sub-bands in a UWB spectrum.
Figure 2:
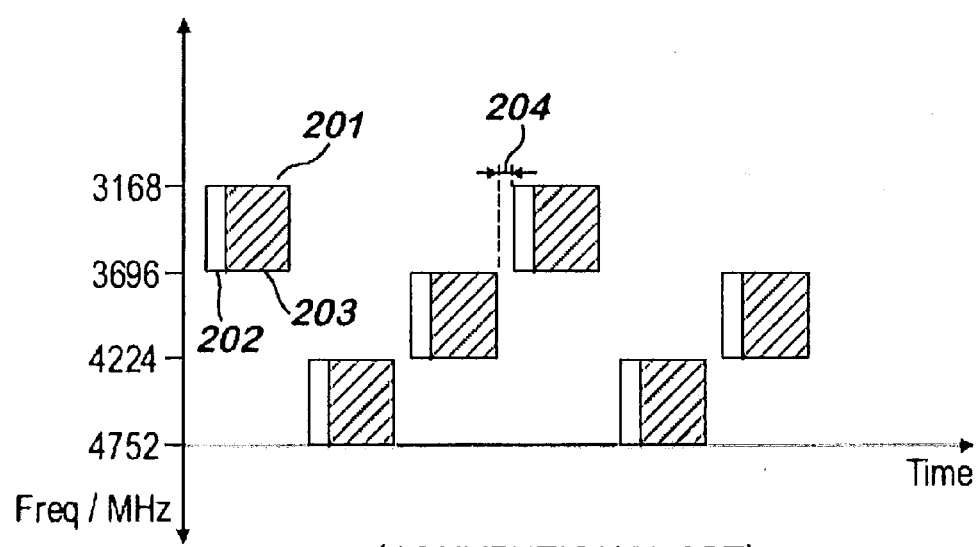
FIG. 2 shows a frequency-hopping scheme for a UWB system.
Figure 3:
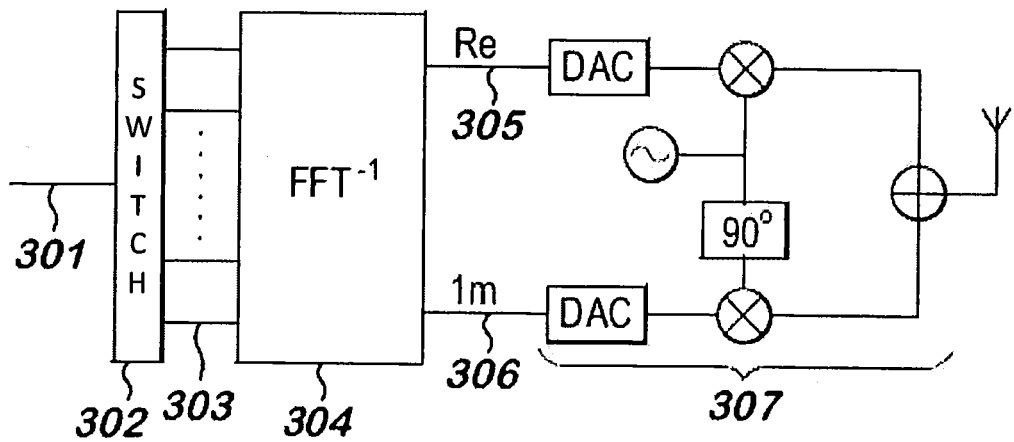
FIG. 3 shows an OFDM transmitter.
Figure 4:
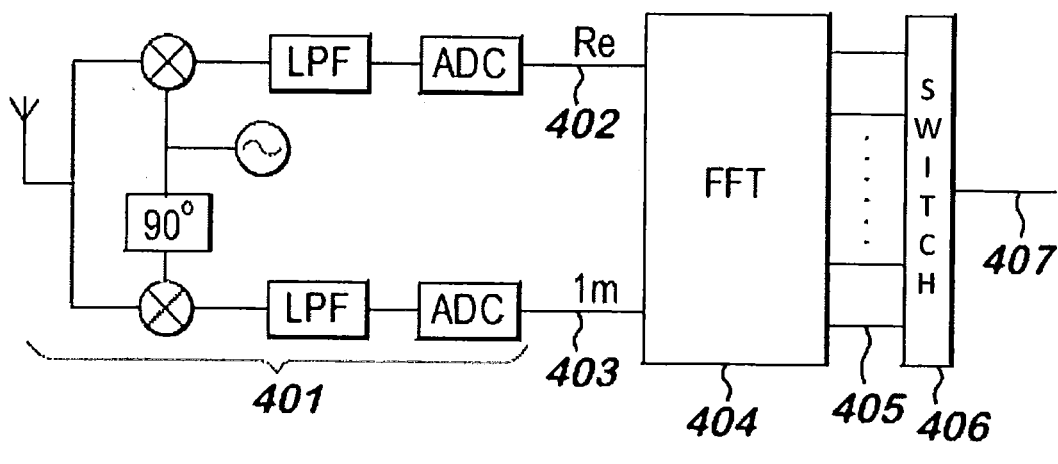
FIG. 4 shows an OFDM receiver.
Figure 5:
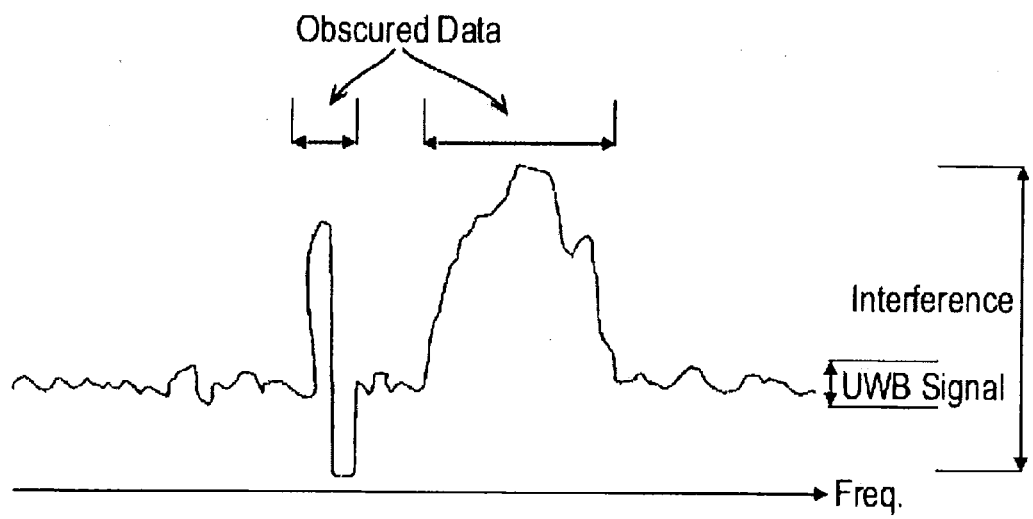
FIG. 5 shows a UWB signal that is subject to interference.
Figure 8:
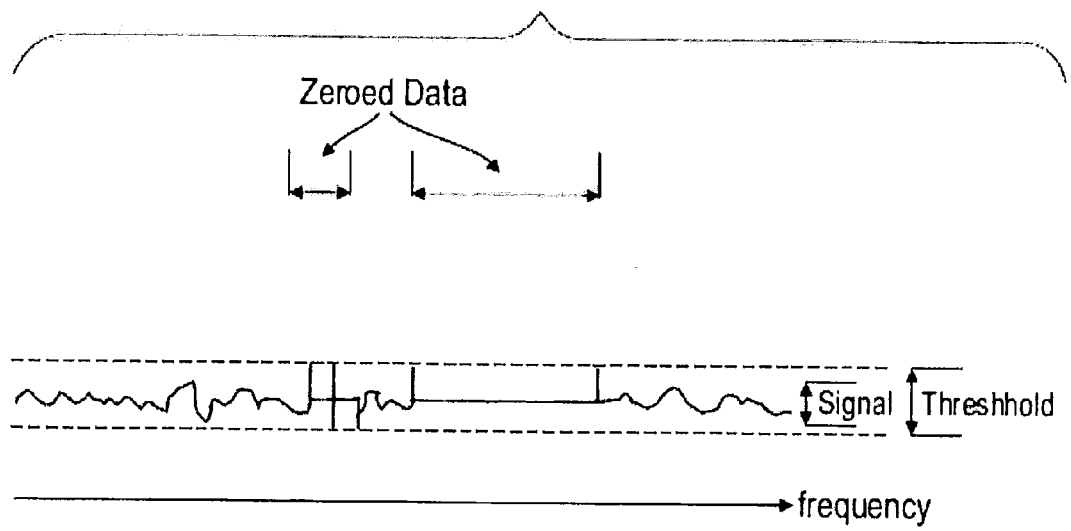
FIG. 8 shows a frequency spectrum in which sections of the signal subject to interference have been adjusted to zero.

In one example, if a sub-carrier is determined to have been subject to the predetermined level of interference, the candidate vector corresponding to that sub-carrier is set to zero. This example is shown in FIG. 8, which illustrates a frequency spectrum corresponding to the spectrum shown in FIG. 5 but with the interference removed by setting those parts of the spectrum to zero. This does result in some loss of information. However, this may be preferable to the risk of decoding the transmit data incorrectly due to the interference. Removing the interference by setting the affected sub-carriers to zero may be particularly suitable for receivers that use some form of statistical processing during the decoding process (for example, receivers that use Maximum Ratio Combining for despreading and/or soft-inputs for decoding) because the value of zero indicates that there is no information associated with that sub-carrier, which may be preferable to passing on incorrect information to the later processing stages.

The FFT may output a first number of bits, with a subset of those bits being selected as candidate vectors for further processing. The subset of bits taken for further processing may always be located at the same position within the first number of bits. The receiver may determine that the subset of bits should be adjusted to zero if that subset if saturated. For example, the FFT may output 15 bits in respect of each sub-carrier, with 8 of those bits being selected for further processing. If a sub-carrier saturates those 8 bits, they are set to zero in the candidate vector that is passed on for further processing.

It may be that all of the sub-carriers have been subject to interference. This may happen if interference occurs in the middle of a transmission (otherwise gain control should typically prevent ADC saturation). In this situation, either or both of the in-phase or quadrature signals may saturate. The receiver may set all of the candidate vectors to zero if either the in-phase or quadrature signals saturate. In practice, this may mean that all of the candidate vectors are set to zero if the output of the ADC in either the in-phase or quadrature paths saturates.

In a refinement to the algorithm described above, sub-carriers that are adjacent to a saturated sub-carrier may also be assumed to have been subject to interference. Therefore, the candidate vectors corresponding to these adjacent sub-carriers may also be set to zero.

Rather than setting all sub-carriers that have been subject to interference to zero, a sliding scale may be employed in which the magnitude of each of the carrier vectors corresponding to interfered sub-carriers is reduced, but not necessarily to zero and not necessarily by the same amount. For example, each of the candidate vectors corresponding to interfered sub-carriers might be multiplied by a multiplier having a value between 0 and 1. The multiplier might be a vector. It may be advantageous to choose multiples that can be implemented by a bit shift.

The multiplier might be selected in dependence on the amplitude or energy level of the received signal. For example, the greater the energy of the received signal, the lower the multiplier that may be used to adjust the candidate vectors corresponding to each of the interfered sub-carriers. The multiplier may decay according to a non-linear function, so that it decays quickly to zero with increasing energy in the received signal. Another option is for the selection of the multiplier to be dependent on an estimation of the channel. For example, the magnitude of the affected candidate vectors might be reduced dependent on a difference between the amplitude/energy level of the received signal compared with the amplitude/energy level predicted by the channel estimator. This option may be suitable for interferences that appear in the middle of a received frame.

The adjustment might also be selected in dependence on each of the sub-carriers. For example, the multipliers might be selected in dependence on the output of each FFT. In this case, different adjustments may be applied to each candidate vector.

The selection of a suitable multiplier might be performed by the control unit shown in FIG. 6. This selection might be performed in dependence on a predetermined function (which may be non-linear) relating candidate vectors and their corresponding adjusted candidate vectors, information from the adjustments units, information from a monitoring unit (not shown) that monitors the amplitude or energy levels of the received signal and/or information from the channel estimator etc. The control unit may inform the adjustment units of how each of the candidate vectors is to be adjusted, e.g. a number of bit shifts to be performed.

In addition to adjusting the candidate vectors that are indicative of interference by a suitable multiplier, similar adjustments may be made to candidate vectors for adjacent sub-carriers, i.e. adjacent sub-carriers need not be reduced to zero, but may be decreased according to some predetermined function in a similar way to that described above.

Figure 9:
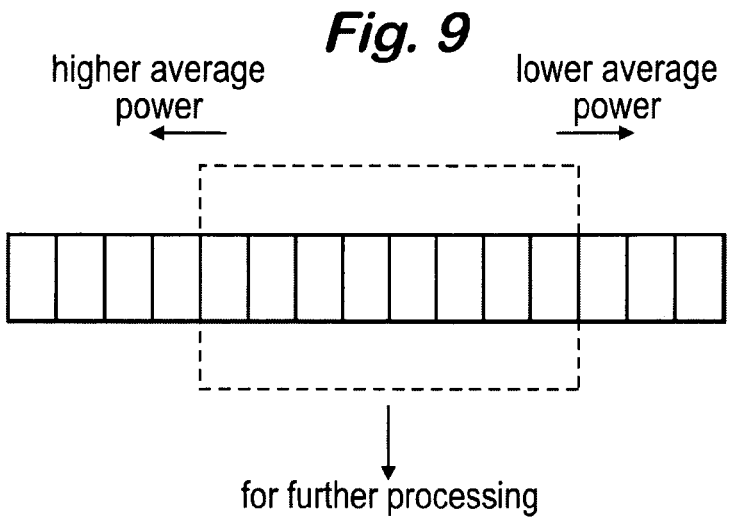
FIG. 9 shows a selection window for selecting the candidate vector.

In a further example, the subset of bits that is selected from the bits output by the FFT for further processing may not always be in the same position. The receiver may be able to vary the "selection window" as a form of gain control. For example, a form of time domain gain control may be implemented in which the subset of bits is selected in dependence on the average power of the received signal across all sub-carriers. So, for example, if the average power is relatively high, this may cause the selection window to effectively move to the left, while if the average power is relatively low, this may cause the selection window to effectively move to the right. This is illustrated in FIG. 9. The same effect may be achieved by bit shifting the output of the FFT right or left, as appropriate, and keeping the selection window unchanged.

If many of the sub-carriers are saturated, this will cause the average power across all sub-carriers to be relatively high, causing the selection window shown in FIG. 9 to effectively shift to the left. This means that the magnitude of the candidate vectors for the other sub-carriers will be relatively low. Therefore, rather than keeping the position of the selection window constant, it may be advantageous to move the selection window to the right for the sub-carriers that have not been subject to interference. This may improve resolution for the non-saturated carriers.

Instead of reducing the influence of interference on the determination of the transmit data by reducing the magnitude of the candidate vectors corresponding to interfered sub-carriers, it is also possible to reduce this influence by increasing the magnitude of the candidate vectors corresponding to sub-carriers that have not been subject to interference. One way of doing this is by shifting the bits output by the FFT to the left. This may be performed for each sub-carrier, with the FFT bits shifted to the left until the first non-zero bit for each FFT output is in the same position. An example of such a bit shift is shown in FIG. 10.

Figure 10:
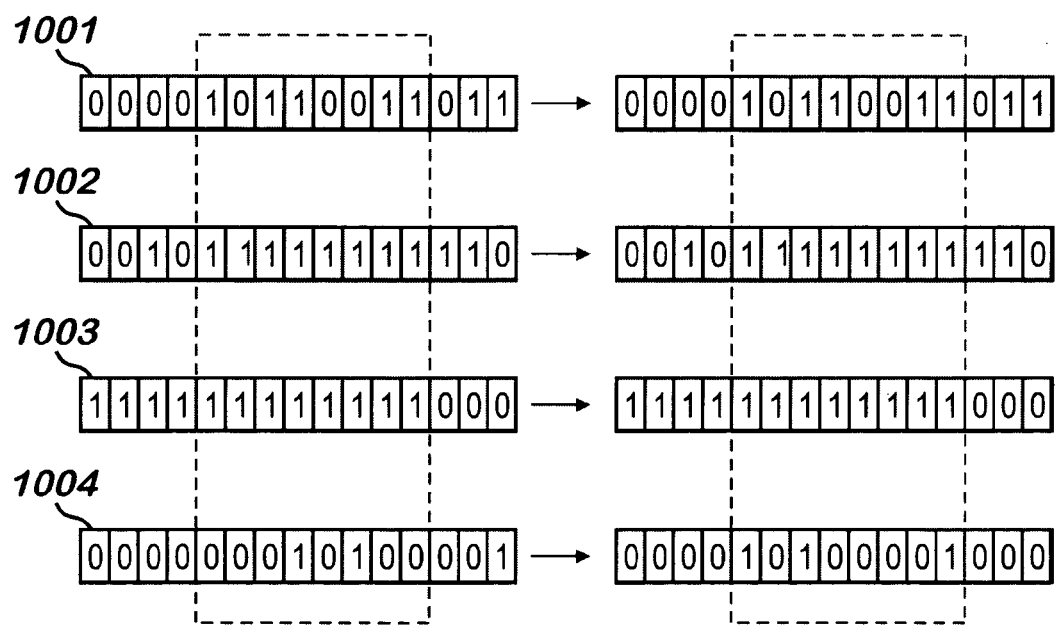
FIG. 10 shows a bit shift for scaling all sub-carriers to roughly the same value.

In FIG. 10, the data strings on the left-hand side represent the FFT outputs corresponding to four sub-carriers. The data strings on the right-hand side represent the FFT outputs corresponding to those same four sub-carriers after a bit shift. The FFT outputs 1002 and 1003 are considered to correspond to sub-carriers that are subject to interference that exceeds the predetermined threshold because the 8 bits located within the selection window are saturated. The FFT outputs 1001 and 1004 correspond to sub-carriers that have not been subject to interference that exceeds the predetermined threshold because the 8 bits within the selection window are not saturated. A bit shift is then performed on the non-saturated carriers so that the first non-zero bit for those sub-carriers is located in the leftmost bit of the selection window. In this example, only data string 1004 requires adjustment. After bit selection, all sub-carriers have roughly the same value because each has its leading non-zero value located in the same position.

Figure 11:
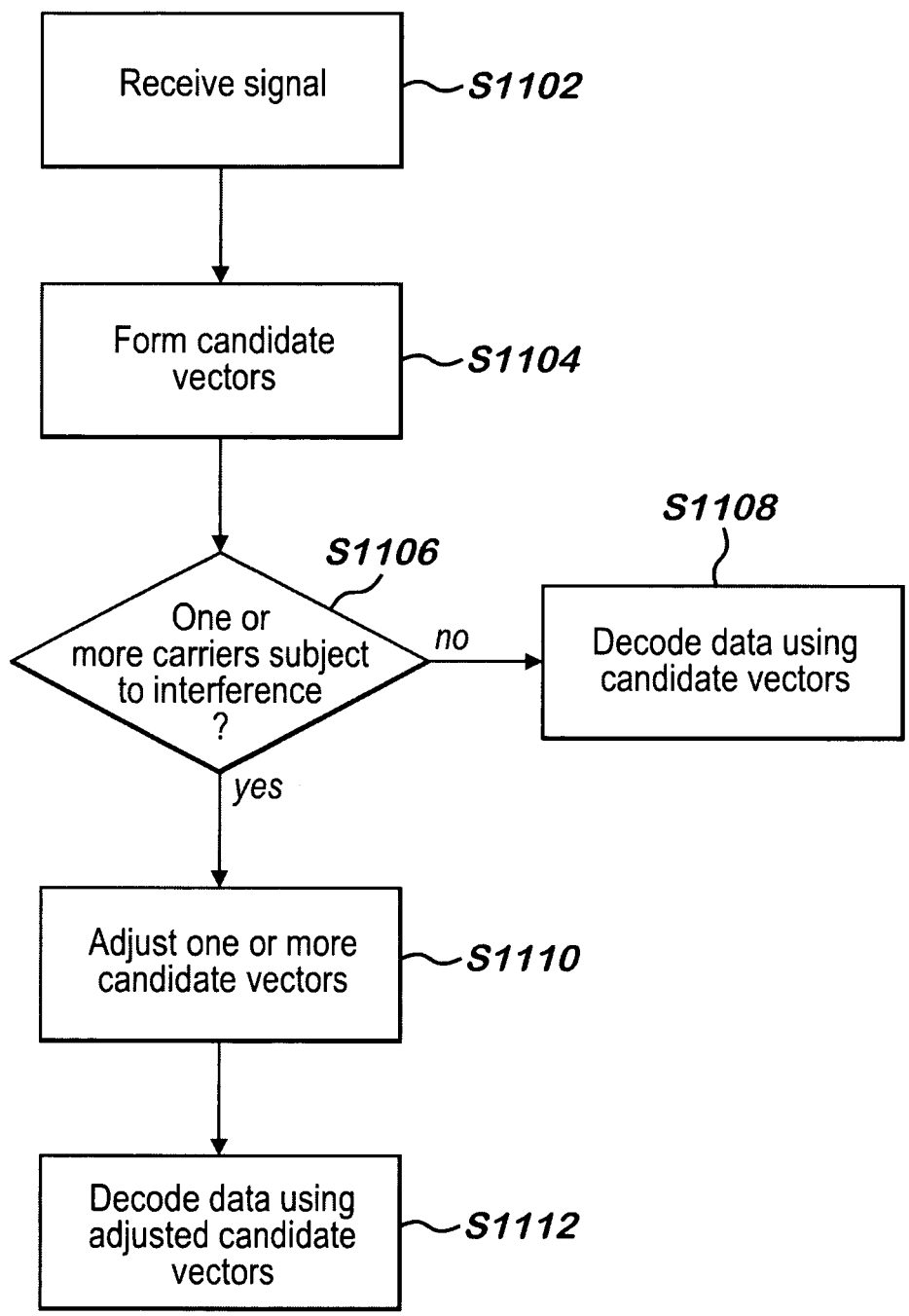
FIG. 11 shows a method of decoding a received signal.

An example of a method for decoding received signals is illustrated in FIG. 11. The steps of the method include receiving a signal (step S1102), forming candidate vectors from that received signal (step S1104) and determining whether one or more of the sub-carriers in the received signal was subject to interference (step S1106). If no, the signal is decoded using the existing candidate vectors (step S1108). If yes, one or more of the candidate vectors is adjusted (step S1110) and the signal is decoded using the adjusted candidate vectors (step S1112).

The examples above describe various ways in which candidate vectors might be adjusted to counteract the influence of interference on the determination of transmit data. Each of these examples need not be taken in isolation. Instead, elements of one example (e.g. decreasing saturated sub-carriers) may be combined with elements of another example (e.g. increasing non-saturated sub-carriers).

The above examples have mainly concentrated on multiplication/division of the candidate vectors. However, the receiver might equally implement adjustments involving subtraction and/or addition.

A receiver according to embodiments of the invention has been described above mainly with reference to UWB transmission systems. This is for the purposes of example only and it should be understood that the principles described herein might equally be implemented in receivers for transmission systems other than UWB systems.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A receiver for receiving a signal that is representative of a plurality of sub-carriers modulated in dependence on transmit data, the receiver being arranged to determine a plurality of candidate vectors in dependence on the received signal, each of the candidate vectors being indicative of a modulation applied to a respective one of the sub-carriers, the receiver comprising:
    means for determining that the received signal incorporates a predetermined level of interference in respect of one or more of the sub-carriers, and for adjusting one or more of the candidate vectors in dependence on that determination; and
    means for determining the transmit data in dependence on the one or more adjusted candidate vectors;
    the receiver being arranged to adjust the one or more candidate vectors so as to reduce an influence that the candidate vectors indicative of the one or more sub-carriers would otherwise have had on the determination of the transmit data,
    wherein the receiver is arranged to adjust the one or more candidate vectors by decreasing the magnitude of the candidate vectors that are indicative of a modulation applied to sub-carriers in respect of which the received signal is determined to incorporate the predetermined level of interference in accordance with a predetermined, non-linear function that relates the magnitude of a candidate vector with the magnitude of the adjusted candidate vector to be formed from that candidate vector, such that the larger the magnitude of the candidate vector, the greater the proportion by which the magnitude of that vector is reduced to form the adjusted candidate vector.

2. A receiver as claimed in claim 1, wherein the receiver is arranged to determine that a received signal incorporates the predetermined level of interference in respect of a sub-carrier if the candidate vector indicative of a modulation applied to that sub-carrier has a magnitude that exceeds a predetermined threshold.

3. A receiver as claimed in claim 1, wherein the receiver is arranged to form in-phase and quadrature signals from the received signal, the receiver being arranged to determine that the received signal incorporates the predetermined level of interference in respect of all of the sub-carriers if either of the in-phase or quadrature signals has an amplitude that exceeds a predetermined threshold.

4. A receiver as claimed in claim 1, wherein the receiver is arranged to form in-phase and quadrature signals from the received signal, the receiver being arranged to determine the plurality of candidate vectors by means of a Fourier transform performed on those in-phase and quadrature signals.

5. A receiver as claimed in claim 1, wherein the receiver is arranged to determine the transmit data in dependence on the magnitude of the adjusted and non-adjusted candidate vectors such that each candidate vector exerts an influence on the determination that is dependent on the magnitude of that vector.

6. A receiver as claimed in claim 1, wherein the receiver is arranged to adjust the one or more candidate vectors by changing the magnitude of those one or more candidate vectors.

7. A receiver as claimed in claim 1, wherein the receiver is arranged to decrease the magnitude of the candidate vectors indicative of a modulation applied to sub-carriers in respect of which the received signal is determined to incorporate the predetermined level of interference by multiplying each of those candidate vectors by a multiplier.

8. A receiver as claimed in claim 7, wherein the receiver is arranged to select the multiplier in dependence on an amplitude of the received signal.

9. A receiver as claimed in claim 7, wherein the receiver is arranged to select the multiplier in dependence on a channel estimation associated with a transmit channel over which the received signal was received.

10. A receiver as claimed in claim 1, wherein the receiver is arranged to adjust the one or more candidate vectors by decreasing to zero the candidate vectors that are indicative of a modulation applied to sub-carriers in respect of which the received signal is determined to incorporate the predetermined level of interference.

11. A receiver as claimed in claim 1, wherein the receiver is arranged to adjust the one or more candidate vectors by increasing the magnitude of candidate vectors that are indicative of a modulation applied to sub-carriers in respect of which the received signal does not incorporate the predetermined level of interference.

12. A receiver as claimed in claim 11, wherein the receiver is arranged to increase the magnitude of those candidate vectors by multiplying each of those candidate vectors by a multiplier.

13. A receiver as claimed in claim 1, wherein the receiver is arranged to generate data strings that correspond to each sub-carrier, each data string comprising a plurality of bits, and to select a subset of that plurality of bits to form each candidate vector.

14. A receiver as claimed in claim 13, wherein the receiver is arranged to form in-phase and quadrature signals from the received signal, the receiver being arranged to determine the plurality of candidate vectors by means of a Fourier transform performed on those in-phase and quadrature signals, and
    wherein the receiver is arranged to generate the data strings by performing a Fourier transform on the in-phase and quadrature signals.

15. A receiver as claimed in claim 13, wherein the receiver is arranged to adjust the one or more candidate vectors by shifting the bits of the data strings that form those one or more candidate vectors in a first direction until each of the one or more candidate vectors contains a bit of predetermined value at a predetermined position within that vector.

16. A receiver as claimed in claim 15, wherein the receiver is arranged to shift the bits contained within each data string until the leftmost, non-zero bit of every candidate vector is located at the same position in each candidate vector.

17. A method for decoding a signal that is representative of a plurality of sub-carriers modulated in dependence on transmit data, the method comprising:
    determining a plurality of candidate vectors in dependence on the received signal, each of the candidate vectors being indicative of a modulation applied to a respective one of the sub-carriers;
    determining that the received signal incorporates a predetermined level of interference in respect of one or more of the sub-carriers and adjusting one or more of the candidate vectors in dependence on that determination; and
    determining the transmit data in dependence on the one or more adjusted candidate vectors;

wherein the one or more candidate vectors are adjusted so as to reduce an influence that the candidate vectors indicative of the one or more sub-carriers would otherwise have had on the determination of the transmit data, wherein the method further comprises:

adjusting the one or more candidate vectors by decreasing the magnitude of the candidate vectors that are indicative of a modulation applied to sub-carriers in respect of which the received signal is determined to incorporate the predetermined level of interference in accordance with a predetermined, non-linear function that relates the magnitude of a candidate vector with the magnitude of the adjusted candidate vector to be formed from that candidate vector, such that the larger the magnitude of the candidate vector, the greater the proportion by which the magnitude of that vector is reduced to form the adjusted candidate vector.

18. A method as claimed in claim 17, comprising determining that a received signal incorporates the predetermined level of interference in respect of a sub-carrier if the candidate vector indicative of a modulation applied to that sub-carrier has a magnitude that exceeds a predetermined threshold.

19. A method as claimed in claim 17, comprising forming in-phase and quadrature signals from the received signal and determining that the received signal incorporates the predetermined level of interference in respect of all of the sub-carriers if either of the in-phase or quadrature signals has an amplitude that exceeds a predetermined threshold.

20. A method as claimed in claim 17, comprising forming in-phase and quadrature signals from the received signal and determining the plurality of candidate vectors by means of a Fourier transform performed on those in-phase and quadrature signals.

21. A method as claimed in claim 17, comprising determining the transmit data in dependence on the magnitude of the adjusted and non-adjusted candidate vectors such that each candidate vector exerts an influence on the determination that is dependent on the magnitude of that vector.

22. A method as claimed in claim 17, comprising adjusting the one or more candidate vectors by changing the magnitude of those one or more candidate vectors.

23. A method as claimed in claim 17, comprising decreasing the magnitude of the candidate vectors that are indicative of a modulation applied to sub-carriers in respect of which the received signal is determined to incorporate the predetermined level of interference by multiplying each of those candidate vectors by a multiplier.

24. A method as claimed in claim 23, comprising selecting the multiplier in dependence on an amplitude of the received signal.

25. A method as claimed in claim 23, comprising selecting the multiplier in dependence on a channel estimation associated with a transmit channel over which the received signal was received.

26. A method as claimed in claim 17, comprising adjusting the one or more candidate vectors by decreasing to zero the candidate vectors that are indicative of a modulation applied to sub-carriers in respect of which the received signal is determined to incorporate the predetermined level of interference.

27. A method as claimed in claim 17, comprising generating data strings that correspond to each sub-carrier, each data string comprising a plurality of bits, and to select a subset of that plurality of bits to form each candidate vector.

28. A method as claimed in claim 27 as dependent directly or indirectly on claim 20, wherein the receiver is arranged to generate the data strings by performing a Fourier transform on the in-phase and quadrature signals.

29. A method as claimed in claim 27, comprising adjusting the one or more candidate vectors by shifting the bits of the data strings that form those one or more candidate vectors in a first direction until each of the one or more candidate vectors contains a bit of predetermined value at a predetermined position within that vector.

30. A method as claimed in claim 29, comprising shifting the bits contained within each data string until the leftmost, non-zero bit of every candidate vector is located at the same position in each candidate vector.

31. A receiver for receiving a signal that is representative of a plurality of sub-carriers modulated in dependence on transmit data, the receiver being arranged to determine a plurality of candidate vectors in dependence on the received signal, each of the candidate vectors being indicative of a modulation applied to a respective one of the sub-carriers, the receiver comprising:

means for determining that the received signal incorporates a predetermined level of interference in respect of one or more of the sub-carriers, and for adjusting one or more of the candidate vectors in dependence on that determination; and means for determining the transmit data in dependence on the one or more adjusted candidate vectors;

the receiver being arranged to adjust the one or more candidate vectors so as to reduce an influence that the candidate vectors indicative of the one or more sub-carriers would otherwise have had on the determination of the transmit data, wherein the receiver is arranged to adjust the one or more candidate vectors by increasing the magnitude of candidate vectors that are indicative of a modulation applied to sub-carriers in respect of which the received signal does not incorporate the predetermined level of interference by multiplying each of those candidate vectors by a multiplier, and wherein the receiver is arranged to multiply every candidate vector that is indicative of a modulation applied to sub-carriers in respect of which the received signal does not incorporate the predetermined level of interference by the same multiplier.

32. A receiver as claimed in claim 31, wherein the receiver is arranged to multiply one of the candidate vectors that is indicative of a modulation applied to sub-carriers in respect of which the received signal does not incorporate the predetermined level of interference by a different multiplier from another of those candidate vectors.

33. A receiver as claimed in claim 31, wherein the receiver is arranged to increase the magnitude of the candidate vectors indicative of a modulation applied to sub-carriers in respect of which the received signal is determined not to incorporate the predetermined level of interference in accordance with a predetermined, non-linear function that relates the magnitude of a candidate vector with the magnitude of the adjusted candidate vector to be formed from that candidate vector, such that the smaller the magnitude of the candidate vector, the greater the proportion by which the magnitude of that vector is increased to form the adjusted candidate vector.

34. A receiver for receiving a signal that is representative of a plurality of sub-carriers modulated in dependence on transmit data, the receiver being arranged to determine a plurality of candidate vectors in dependence on the received signal, each of the candidate vectors being indicative of a modulation applied to a respective one of the sub-carriers, the receiver comprising:

means for determining that the received signal incorporates a predetermined level of interference in respect of one or more of the sub-carriers, and for adjusting one or more of the candidate vectors in dependence on that determination; and means for determining the transmit data in dependence on the one or more adjusted candidate vectors;

the receiver being arranged to adjust the one or more candidate vectors so as to reduce an influence that the candidate vectors indicative of the one or more sub-carriers would otherwise have had on the determination of the transmit data, wherein the receiver is arranged to determine that a candidate vector is indicative of a modulation applied to a sub-carrier that is adjacent in a frequency spectrum to a sub-carrier in respect of which the received signal incorporates the predetermined level of interference and to, responsive to that determination, adjust that candidate vector so as to reduce an influence that the candidate vector would otherwise have had on the determination of the transmit data.

35. A method for decoding a signal that is representative of a plurality of sub-carriers modulated in dependence on transmit data, the method comprising:

determining a plurality of candidate vectors in dependence on the received signal, each of the candidate vectors being indicative of a modulation applied to a respective one of the sub-carriers;

determining that the received signal incorporates a predetermined level of interference in respect of one or more of the sub-carriers and adjusting one or more of the candidate vectors in dependence on that determination; and determining the transmit data in dependence on the one or more adjusted candidate vectors;

wherein the one or more candidate vectors are adjusted so as to reduce an influence that the candidate vectors indicative of the one or more sub-carriers would otherwise have had on the determination of the transmit data by increasing the magnitude of candidate vectors that are indicative of a modulation applied to sub-carriers in respect of which the received signal does not incorporate the predetermined level of interference, wherein increasing the magnitude of those candidate vectors comprises multiplying each of those candidate vectors by a multiplier, the method further comprising multiplying every candidate vector that is indicative of a modulation applied to sub-carriers in respect of which the received signal does not incorporate the predetermined level of interference by the same multiplier.

36. A method as claimed in claim 35, comprising multiplying one of the candidate vectors that is indicative of a modulation applied to sub-carriers in respect of which the received signal does not incorporate the predetermined level of interference by a different multiplier from another of those candidate vectors.

37. A method as claimed in claim 35, comprising increasing the magnitude of the candidate vectors indicative of a modulation applied to sub-carriers in respect of which the received signal is determined not to incorporate the predetermined level of interference in accordance with a predetermined, non-linear function that relates the magnitude of a candidate vector with the magnitude of the adjusted candidate vector to be formed from that candidate vector, such that the smaller the magnitude of the candidate vector, the greater the proportion by which the magnitude of that vector is increased to form the adjusted candidate vector.

38. A method for decoding a signal that is representative of a plurality of sub-carriers modulated in dependence on transmit data, the method comprising:

determining a plurality of candidate vectors in dependence on the received signal, each of the candidate vectors being indicative of a modulation applied to a respective one of the sub-carriers;

determining that the received signal incorporates a predetermined level of interference in respect of one or more of the sub-carriers and adjusting one or more of the candidate vectors in dependence on that determination; and determining the transmit data in dependence on the one or more adjusted candidate vectors;

wherein the one or more candidate vectors are adjusted so as to reduce an influence that the candidate vectors indicative of the one or more sub-carriers would otherwise have had on the determination of the transmit data, the method further comprising:

determining that a candidate vector is indicative of a modulation applied to a sub-carrier that is adjacent in a frequency spectrum to a sub-carrier in respect of which the received signal incorporates the predetermined level of interference and, responsive to that determination, adjusting that candidate vector so as to reduce an influence that the candidate vector would otherwise have had on the determination of the transmit data.

* * * * *